US009632895B2

(12) United States Patent
Menon et al.

(10) Patent No.: US 9,632,895 B2
(45) Date of Patent: Apr. 25, 2017

(54) APPARATUS, SYSTEM AND METHOD FOR A COMMON UNIFIED DEBUG ARCHITECTURE FOR INTEGRATED CIRCUITS AND SOCS

(71) Applicants: Sankaran M Menon, Austin, TX (US); Rajendra S Yavatkar, Portland, OR (US); Eyal Dolev, Holon (IL); Sridhar Valluru, Austin, TX (US); Ramana Rachakonda, Austin, TX (US)

(72) Inventors: Sankaran M Menon, Austin, TX (US); Rajendra S Yavatkar, Portland, OR (US); Eyal Dolev, Holon (IL); Sridhar Valluru, Austin, TX (US); Ramana Rachakonda, Austin, TX (US)

(73) Assignee: INTEL CORPORATION, Santa Clara, CA (US)

( * ) Notice: Subject to any disclaimer, the term of this patent is extended or adjusted under 35 U.S.C. 154(b) by 356 days.

(21) Appl. No.: 13/834,134

(22) Filed: Mar. 15, 2013

(65) Prior Publication Data
US 2013/0339790 A1 Dec. 19, 2013

Related U.S. Application Data

(63) Continuation-in-part of application No. 13/526,211, filed on Jun. 18, 2012.

(51) Int. Cl.
*G06F 11/00* (2006.01)
*G06F 11/27* (2006.01)
(Continued)

(52) U.S. Cl.
CPC .......... *G06F 11/27* (2013.01); *G06F 11/2733* (2013.01); *G06F 11/36* (2013.01); *G06F 11/3656* (2013.01)

(58) Field of Classification Search
CPC .... G06F 11/27; G06F 11/273; G06F 11/2733; G06F 11/36; G06F 11/3656
(Continued)

(56) References Cited

U.S. PATENT DOCUMENTS 8,024,614 B2 9/2011 Nadehara
2001/0043648 A1 11/2001 Ducaroir et al.
(Continued)

OTHER PUBLICATIONS

Office Action received for U.S Appl. No. 13/526,211, mailed on Mar. 13, 2014, 9 pages.
(Continued)

*Primary Examiner* — Joseph D Manoskey
(74) *Attorney, Agent, or Firm* — The Law Office of Herbert T. Patty

(57) ABSTRACT

A system and method for a common unified debug architecture for integrated circuits and System on Chips (SoCs) are provided. A system consistent with the present disclosure may comprise of an integrated circuit or SoC which includes a display port, plurality of logic blocks, and debug logic. The debug logic may receive debug data from one or more of the plurality of logic blocks in response to the integrated circuit or SoC operating in a debug mode. In addition, control logic coupled to the debug logic. The control logic provides display data to the display port in response to the integrated circuit operating in an operational mode. The control logic further directs high-speed debug data to the display port in response to the integrated circuit or SoC operating in the debug mode. The high-speed debug data is to be based on the debug data.

28 Claims, 9 Drawing Sheets

(51) Int. Cl.
*G06F 11/36* (2006.01)
*G06F 11/273* (2006.01)

(58) Field of Classification Search
USPC ......... 714/30, 25, 27, 31, 37, 40, 41, 45, 57
See application file for complete search history.

(56) References Cited

U.S. PATENT DOCUMENTS

| | | |
|---|---|---|
| 2002/0007264 A1 | 1/2002 | Swoboda |
| 2003/0056154 A1 | 3/2003 | Edwards et al. |
| 2008/0040636 A1 | 2/2008 | Mayer et al. |
| 2010/0023807 A1 | 1/2010 | Wu et al. |
| 2010/0100770 A1* | 4/2010 | Mejdrich et al. ............... 714/37 |
| 2010/0318848 A1 | 12/2010 | Yang et al. |
| 2011/0283141 A1* | 11/2011 | Lee et al. ......................... 714/30 |
| 2012/0159254 A1* | 6/2012 | Su et al. ........................ 714/36 |
| 2013/0054842 A1* | 2/2013 | Overby ............................. 710/5 |
| 2013/0262928 A1* | 10/2013 | Yang et al. ..................... 714/27 |
| 2013/0339789 A1 | 12/2013 | Menon et al. |

OTHER PUBLICATIONS

Office Action received for U.S. Appl. No. 13/526,211, mailed on Aug. 13, 2014, 10 Pages.

\* cited by examiner

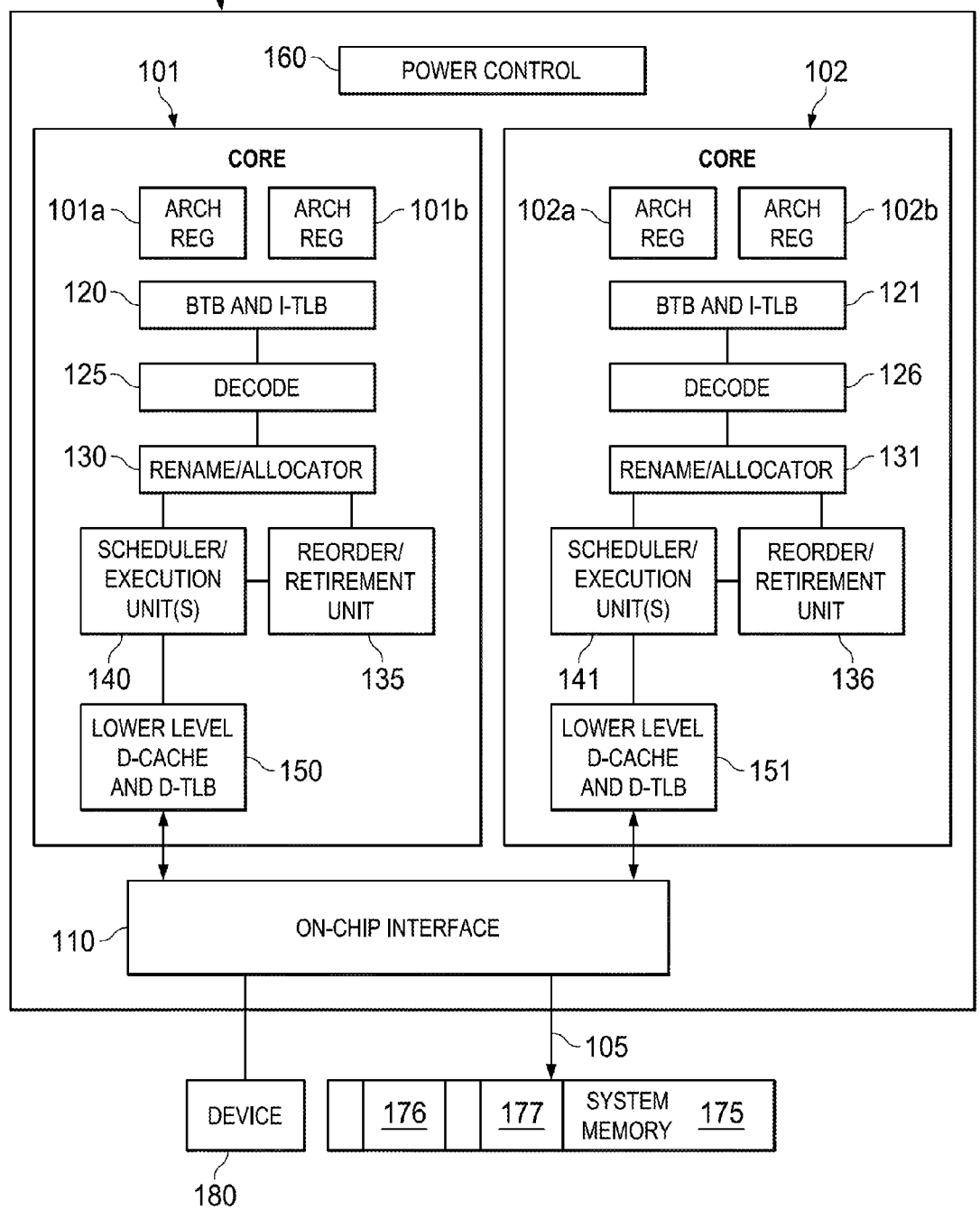

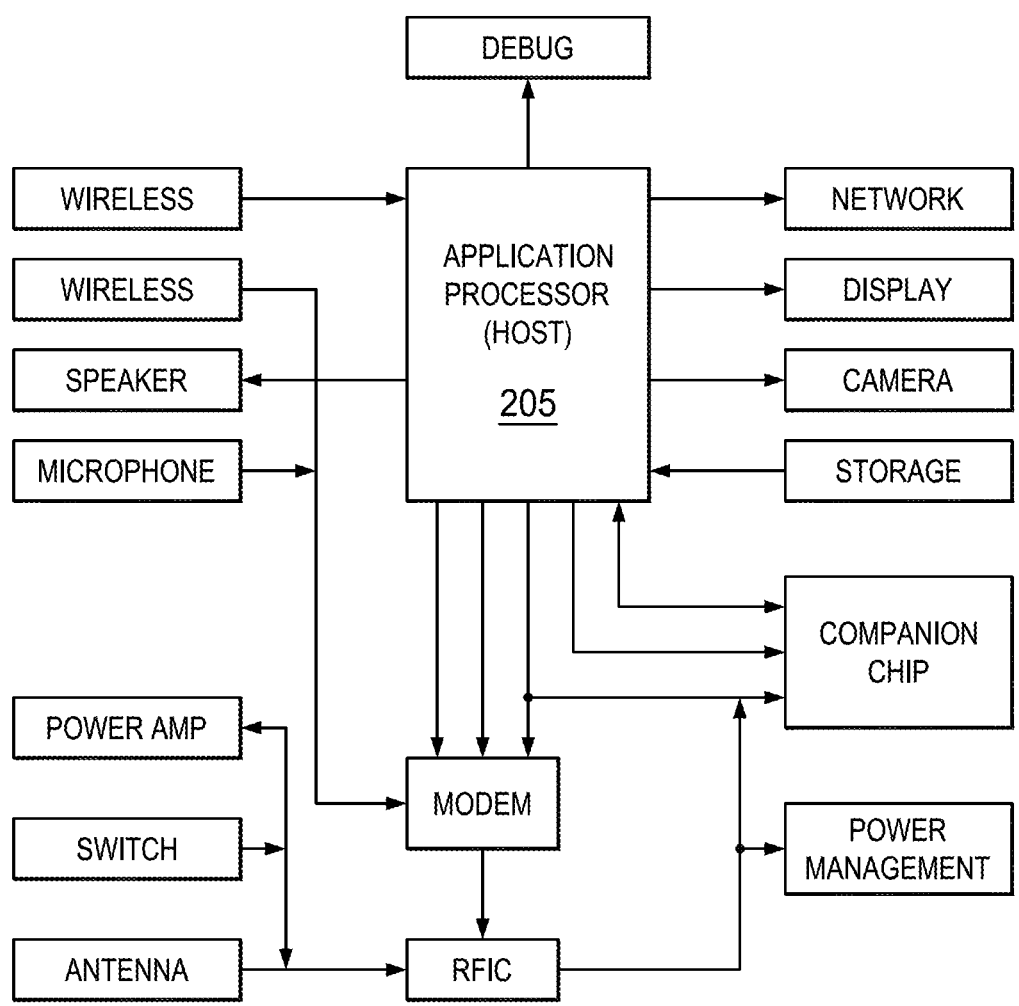

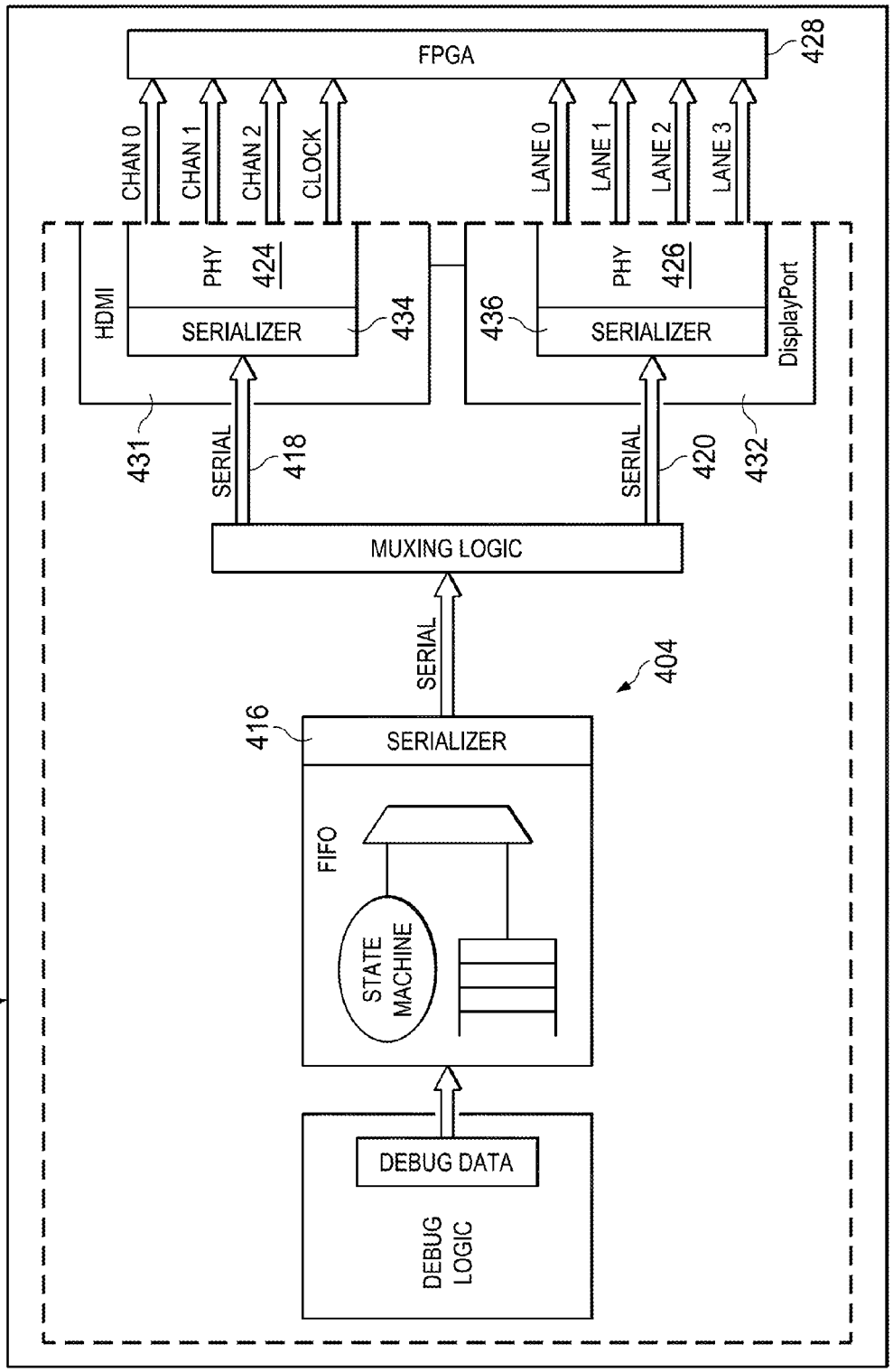

APPARATUS, SYSTEM AND METHOD FOR A COMMON UNIFIED DEBUG ARCHITECTURE FOR INTEGRATED CIRCUITS AND SOCS

FIELD

This disclosure pertains to computing systems, and in particular (but not exclusively) to techniques for supporting transmission of debug test data during debug testing of complex ICs such as System on a Chip (SoC) designs.

BRIEF DESCRIPTION OF THE DRAWINGS

FIG. 1 illustrates an embodiment of a block diagram for a computing system including a multicore processor;

FIG. 2 illustrates an embodiment of a low power physical layer for an interconnect architecture;

FIG. 4C shows further details of an embodiment of a debug architecture employing serialization operations at the debug logic;

DETAILED DESCRIPTION

Figure 3A:
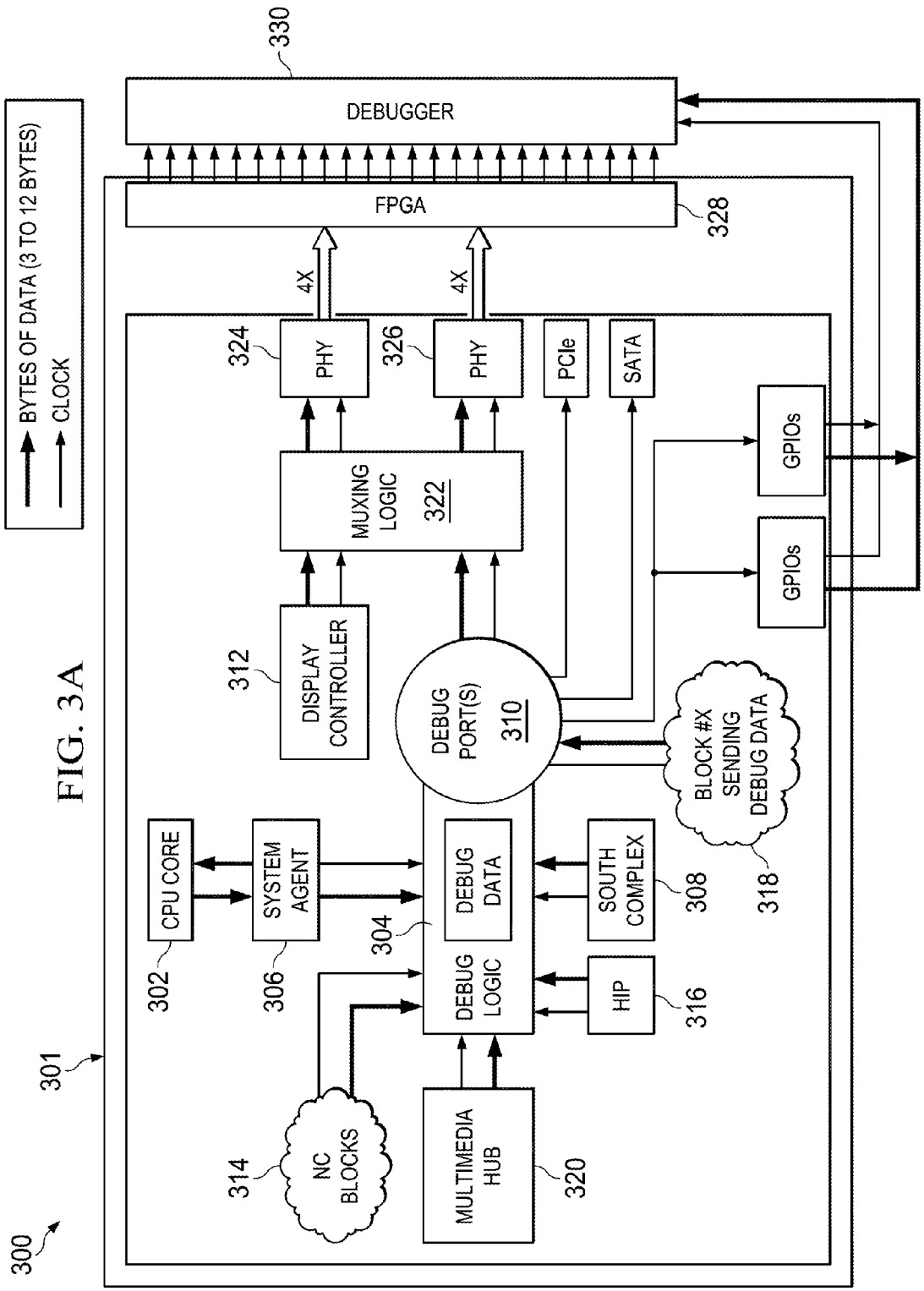
FIG. 3A is a schematic diagram illustrating a debug architecture employing high-speed I/O interface(s) to support high bandwidth transmit of debug data to a debugger, according to an embodiment.

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present disclosure. It will be apparent, however, to one skilled in the art that these specific details need not be employed to practice the present disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of a computer system haven't been described in detail in order to avoid unnecessarily obscuring the present disclosure.

Although the following embodiments may be described with reference to energy conservation and energy efficiency in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to desktop computer systems or Ultrabooks™. And may be also used in other devices, such as handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that may perform the functions and operations taught below. Moreover, the apparatuses, methods, and systems described herein are not limited to physical computing devices, but may also relate to software optimizations for energy conservation and efficiency. As will become readily apparent in the description below, the embodiments of methods, apparatuses, and systems described herein (whether in reference to hardware, firmware, software, or a combination thereof) are vital to a 'green technology' future balanced with performance considerations.

As computing systems advance, the components therein are becoming more complex. As a result, the interconnect architecture to couple and communicate between the components is also increasing in complexity to ensure bandwidth requirements are met for optimal component operation. Furthermore, different market segments demand different aspects of interconnect architectures to suit the market's needs. For example, servers require higher performance, while the mobile ecosystem is sometimes able to sacrifice overall performance for power savings. Yet, it's a singular purpose of most fabrics to provide highest possible performance with maximum power saving. Below, a number of interconnects are discussed, which would potentially benefit from aspects of the disclosure described herein.

Referring to FIG. 1, an embodiment of a block diagram for a computing system including a multicore processor is depicted. Processor 100 includes any processor or processing device, such as a microprocessor, an embedded processor, a digital signal processor (DSP), a network processor, a handheld processor, an application processor, a co-processor, a system on a chip (SoC), or other device to execute code. Processor 100, in some embodiments, includes at least two cores—core 101 and 102, which may include asymmetric cores or symmetric cores (the illustrated embodiment). However, processor 100 may include any number of processing elements that may be symmetric or asymmetric.

In some embodiments, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in some embodiments, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As may be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 100, as illustrated in FIG. 1, includes two cores—core 101 and 102. Here, core 101 and 102 are considered symmetric cores, i.e. cores with the same configurations, functional units, and/or logic. In another embodiment, core 101 includes an out-of-order processor core, while core 102 includes an in-order processor core. However, cores 101 and 102 may be individually selected from any type of core, such as a native core, a software managed core, a core adapted to execute a native Instruction Set Architecture (ISA), a core adapted to execute a translated Instruction Set Architecture (ISA), a co-designed core, or other known core. In a heterogeneous core environment (i.e. asymmetric cores), some form of translation, such a binary translation, may be utilized to schedule or execute code on one or both cores. Yet to further the discussion, the functional units illustrated in core 101 are described in further detail below, as the units in core 102 operate in a similar manner in the depicted embodiment.

As depicted, core 101 includes two hardware threads 101a and 101b, which may also be referred to as hardware thread slots 101a and 101b. Therefore, software entities, such as an operating system, in some embodiments potentially view processor 100 as four separate processors, i.e., four logical processors or processing elements capable of executing four software threads concurrently. As alluded to above, a first thread is associated with architecture state registers 101a, a second thread is associated with architecture state registers 101b, a third thread may be associated with architecture state registers 102a, and a fourth thread may be associated with architecture state registers 102b. Here, each of the architecture state registers (101a, 101b, 102a, and 102b) may be referred to as processing elements, thread slots, or thread units, as described above. As illustrated, architecture state registers 101a are replicated in architecture state registers 101b, so individual architecture states/contexts are capable of being stored for logical processor 101a and logical processor 101b. In core 101, other smaller resources, such as instruction pointers and renaming logic in allocator and renamer block 130 may also be replicated for threads 101a and 101b. Some resources, such as re-order buffers in reorder/retirement unit 135, ILTB 120, load/store buffers, and queues may be shared through partitioning. Other resources, such as general purpose internal registers, page-table base register(s), low-level data cache and data-TLB 115, execution unit(s) 140, and portions of out-of-order unit 135 are potentially fully shared.

Processor 100 often includes other resources, which may be fully shared, shared through partitioning, or dedicated by/to processing elements. In FIG. 1, an embodiment of a purely exemplary processor with illustrative logical units/resources of a processor is illustrated. Note that a processor may include, or omit, any of these functional units, as well as include any other known functional units, logic, or firmware not depicted. As illustrated, core 101 includes a simplified, representative out-of-order (OOO) processor core. But an in-order processor may be utilized in different embodiments. The OOO core includes a branch target buffer 120 to predict branches to be executed/taken and an instruction-translation buffer (I-TLB) 120 to store address translation entries for instructions.

Core 101 further includes decode module 125 coupled to fetch unit 120 to decode fetched elements. Fetch logic, in some embodiments, includes individual sequencers associated with thread slots 101a, 101b, respectively. Usually core 101 is associated with a first ISA, which defines/specifies instructions executable on processor 100. Often machine code instructions that are part of the first ISA include a portion of the instruction (referred to as an opcode), which references/specifies an instruction or operation to be performed. Decode logic 125 includes circuitry that recognizes these instructions from their opcodes and passes the decoded instructions on in the pipeline for processing as defined by the first ISA. For example, as discussed in more detail below decoders 125, in some embodiments, include logic designed or adapted to recognize specific instructions, such as transactional instruction. As a result of the recognition by decoders 125, the architecture or core 101 takes specific, predefined actions to perform tasks associated with the appropriate instruction. It is important to note that any of the tasks, blocks, operations, and methods described herein may be performed in response to a single or multiple instructions; some of which may be new or old instructions. Note decoders 126, in some embodiments, recognize the same ISA (or a subset thereof). Alternatively, in a heterogeneous core environment, decoders 126 recognize a second ISA (either a subset of the first ISA or a distinct ISA).

For example, allocator and renamer block 130 includes an allocator to reserve resources such as register files to store instruction processing results. However, threads 101a and 101b are potentially capable of out-of-order execution, where allocator and renamer block 130 also reserves other resources, such as reorder buffers to track instruction results. Unit 130 may also include a register renamer to rename program/instruction reference registers to other registers internal to processor 100. Reorder/retirement unit 135 includes components, such as the reorder buffers mentioned above, load buffers, and store buffers, to support out-of-order execution and later in-order retirement of instructions executed out-of-order.

Scheduler and execution unit(s) block 140, in some embodiments, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 150 are coupled to execution unit(s) 140. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 101 and 102 share access to higher-level or further-out cache, such as a second level cache associated with on-chip interface 110. Note that higher-level or further-out refers to cache levels increasing or getting further way from the execution unit(s). In some embodiments, higher-level cache is a last-level data cache—last cache in the memory hierarchy on processor 100—such as a second or third level data cache. However, higher level cache is not so limited, as it may be associated with or include an instruction cache. A trace cache—a type of instruction cache—instead may be coupled after decoder 125 to store recently decoded traces. Here, an instruction potentially refers to a macro-instruction (i.e. a general instruction recognized by the decoders), which may decode into a number of micro-instructions (micro-operations).

In the depicted configuration, processor 100 also includes on-chip interface module 110. Historically, a memory controller, which is described in more detail below, has been included in a computing system external to processor 100. In this scenario, on-chip interface 110 is to communicate with devices external to processor 100, such as system memory 175, a chipset (often including a memory controller hub to connect to memory 175 and an I/O controller hub to connect peripheral devices), a memory controller hub, a northbridge, or other integrated circuit. And in this scenario, bus 105 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 175 may be dedicated to processor 100 or shared with other devices in a system. Common examples of types of memory 175 include DRAM, SRAM, non-volatile memory (NV memory), and other known storage devices. Note that device 180 may include a graphic accelerator, processor or card coupled to a memory controller hub, data storage coupled to an I/O controller hub, a wireless transceiver, a flash device, an audio controller, a network controller, or other known device.

Recently however, as more logic and devices are being integrated on a single die, such as SoC, each of these devices may be incorporated on processor 100. For example, in some embodiments, a memory controller hub is on the same package and/or die with processor 100. Here, a portion of the core (an on-core portion) 110 includes one or more controller(s) for interfacing with other devices such as memory 175 or a graphics device. The configuration including an interconnect and controllers for interfacing with such devices is often referred to as an on-core (or un-core configuration). As an example, on-chip interface 110 includes a ring interconnect for on-chip communication and a high-speed serial point-to-point link 105 for off-chip communication. Yet, in the SOC environment, even more devices, such as the network interface, co-processors, memory 175, graphics processor 180, and any other known computer devices/interface may be integrated on a single die or integrated circuit to provide small form factor with high functionality and low power consumption.

In some embodiments, processor 100 is capable of executing a compiler, optimization, and/or translator code 177 to compile, translate, and/or optimize application code 176 to support the apparatus and methods described herein or to interface therewith. A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler potentially inserts operations, calls, functions, etc. in one or more phases of compilation, such as insertion of calls/operations in a front-end phase of compilation and then transformation of the calls/operations into lower-level code during a transformation phase. Note that during dynamic compilation, compiler code or dynamic optimization code may insert such operations/calls, as well as optimize the code for execution during runtime. As a specific illustrative example, binary code (already compiled code) may be dynamically optimized during runtime. Here, the program code may include the dynamic optimization code, the binary code, or a combination thereof.

Similar to a compiler, a translator, such as a binary translator, translates code either statically or dynamically to optimize and/or translate code. Therefore, reference to execution of code, application code, program code, or other software environment may refer to: (1) execution of a compiler program(s), optimization code optimizer, or translator either dynamically or statically, to compile program code, to maintain software structures, to perform other operations, to optimize code, or to translate code; (2) execution of main program code including operations/calls, such as application code that has been optimized/compiled; (3) execution of other program code, such as libraries, associated with the main program code to maintain software structures, to perform other software related operations, or to optimize code; or (4) a combination thereof.

Referring to FIG. 2, an embodiment of a low power computing platform is depicted. In some embodiments, low power computing platform 200 includes a user endpoint having voice capability. Examples of low power systems include a phone, smartphone, tablet, ultraportable notebook, notebook, desktop, server, transmitting device, receiving device, or any other known or available computing platform. The illustrated platform depicts a number of different interconnects to couple multiple different devices. Exemplary discussion of these interconnect are provided below to provide options on implementation and inclusion. However, a low power platform 200 is not required to include or implement the depicted interconnects or devices. Furthermore, other devices and interconnect structures that are not specifically shown may be included.

Starting at the center of the diagram, platform 200 includes application processor 205. Often this includes a low power processor, which may be a version of a processor configuration described herein or known in the industry. As an example, processor 200 is implemented as a system on a chip (SoC). As a specific illustrative example, processor 200 includes an Intel® Architecture Core™-based processor such as an i3, i5, i7 or another such processor available from Intel Corporation, Santa Clara, Calif. One having ordinary skill in the art should appreciate that other low power processors are available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters may instead be present in other embodiments such as an Apple A5/A6 processor, a Qualcomm Snapdragon™ processor, or Texas Instruments' OMAP™ processor.

Further, SoC devices consistent with the present disclosure may include Intel's Low Cost Intel Architecture (LCiA) incorporated within netbooks and tablets and Intel's Low Power Intel Architecture (LPiA) incorporated within smartphones (with Windows or Android operating systems).

Under typical nomenclature, a high-speed serial I/O component may be referred to as a serial I/O interface, a serial I/O port, or simply a serial I/O. In some instances, the terms "interfaces" and "ports" may generally refer to the same things, even though they may use different terms by convention. For example, an I/O interface on a device that has a connector often is referred to as an I/O port, while an interface between a serial I/O on an SoC and a serial I/O on a host device in a platform including the SoC may be referred to as an interface or a port, depending on the type of device and historical usage. In order to avoid confusion, the terminology "high-speed serial I/O interface" is used herein to refer, in one embodiment, to an interface and/or port corresponding to an associated high-speed serial I/O component. Accordingly, the usage of the terminology high-speed serial I/O interface is not to be limited to only components commonly referred to as serial I/O interfaces, but is intended to also cover high-speed serial I/Os in general including components commonly referred to as serial I/O ports.

Embodiments employing aspects of debug logic techniques disclosed herein provide significant advantages over today's debug testing techniques. The substantially greater debug data rates supported by implementations of the techniques facilitate enhanced debug testing that was previously unavailable. The techniques are also scalable, supporting debug testing of more complex SoC, including both existing and future designs. The support for higher debug data rates also facilitates concurrent debug testing for a greater number of blocks than available under conventional techniques, enabling more complex debug testing to be performed.

An exemplary implementation of the debug logic approach is illustrated in FIG. 3A. As shown, FIG. 3A illustrates a SoC device 300 coupled to an evaluation board 301 and includes various blocks that represent an aggregation of logical functions and/or components, including but not limited to, a CPU core, system agent, multiple logic blocks, high-speed serial I/O interfaces, GPIO's, and bus interfaces coupled to a debugger 330.

It should be appreciated by one having ordinary skill in the art that SoC device 300 is not limited to the logical functions and components listed herein. As such, the present disclosure is amenable to include more or less logical functions and components and this may be consistent with the present disclosure so long as the SoC device 300 may aggregate, format, configure, and transmit debug data outbound in a high-speed manner while offering a mechanism to allow for early debug testing at low frequencies.

Debug logic 304 contains logic and interfaces for aggregating (and/or collecting), formatting, and configuring debug data. In an embodiment, debug logic 304 multiplexes (muxes) debug data in multiplexor (muxing) logic 322, and the debug data is sent to a debugger 330 communicatively coupled to SoC device 300 via muxing logic 322.

As illustrated, debug logic 304 may receive debug data from CPU core 302 (via System Agent 306), South Complex block 308, North complex block 314, HIP block 316, additional block(s) 318, and Multimedia Hub 320, as well as from various logic blocks not associated with these hubs.

The quantity of debug data transmitted from each block (i.e., logic blocks comprising functional blocks, hubs, modules, and/or components) may be in the range from 1 to 9 bytes or greater. In some embodiments, 8 bytes of debug data and 1 byte of control data. The transmit bandwidth of debug data from any given block may be anywhere from 200 MTS-400 MTS (Mega Transfers per Second) or greater.

For example, if 10 bytes of debug data is to be transmitted from debug logic 304, a bandwidth of 32,000 Mega-Transfers per second (MTS) would be required (i.e. 10 bytes*400 MTS=32,000 MTS). By comparison, a GPIO pin may typically support a transmit rate of approximately 400 MTS per pin, which equates to a bandwidth of 3,200 MTS per general purpose I/O byte (i.e., 8 general purpose I/O pins used in parallel to transmit a byte of debug data).

In order to match the bandwidth of debug data sent out from debug logic 304, a bandwidth of 32,000 MTS requires about 10 bytes of general purposes I/Os. However, if 10 or more bytes of GPIOs for muxing debug data are not available, there will be insufficient bandwidth to transmit debug data out of the SoC devices. As such, debug testing is limited to the maximum transmit bandwidth available via the general purpose I/Os.

In accordance with some aspects of the embodiments disclosed herein, high-speed serial I/O interfaces may provide bandwidth sufficient to transmit debug data outbound from SoC device 300 at bandwidths of 32,000 MTS or higher.

Figure 3B:
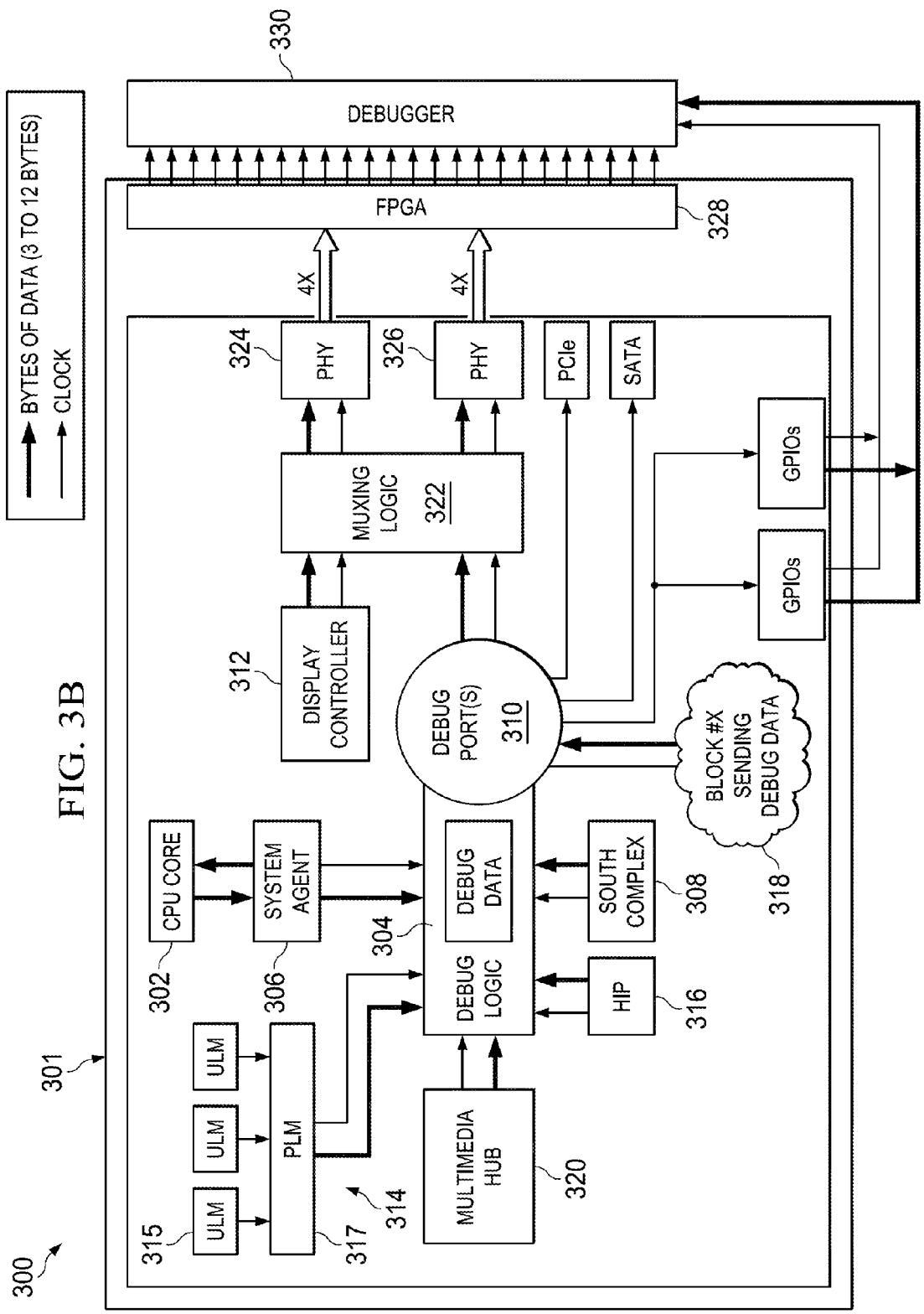
FIG. 3B shows further details of an embodiment of a debug architecture employing unit level and partition level multiplexors within a plurality of logic blocks.

FIG. 3B shows further details of some embodiments of a debug architecture employing a plurality of unit level multiplexors 315 and a single partition level multiplexor 317, within logic blocks on SoC device 300, to aggregate and direct debug data to debug logic 304. It should be understood by one having ordinary skill in the art that the logic blocks on the SoC device 300 may incorporate a plurality of unit level partition level multiplexors 315, 317, therein, to direct and aggregate debug data to debug logic 304.

North Block 314, illustrated in FIG. 3A, is shown in FIG. 3B to include a plurality of unit level multiplexors 315 and a single partition level multiplexor 317. In some embodiments, the unit level multiplexors 315 direct debug data to a single partition level multiplexor 317 coupled thereto. Afterwards, the partition level multiplexor 317 aggregates the collected debug data and directs the data to a central level multiplexor (see FIG. 4A) within the debug logic 306.

In some embodiments, each unit level multiplexor 315 has a transmission bandwidth of up to one byte. As such, three unit level multiplexors 315 has a data transfer bandwidth of three bytes collectively. Further, in some embodiments, partition level multiplexors 317 may store up to eight bytes of data at any given instance.

Figure 4A:
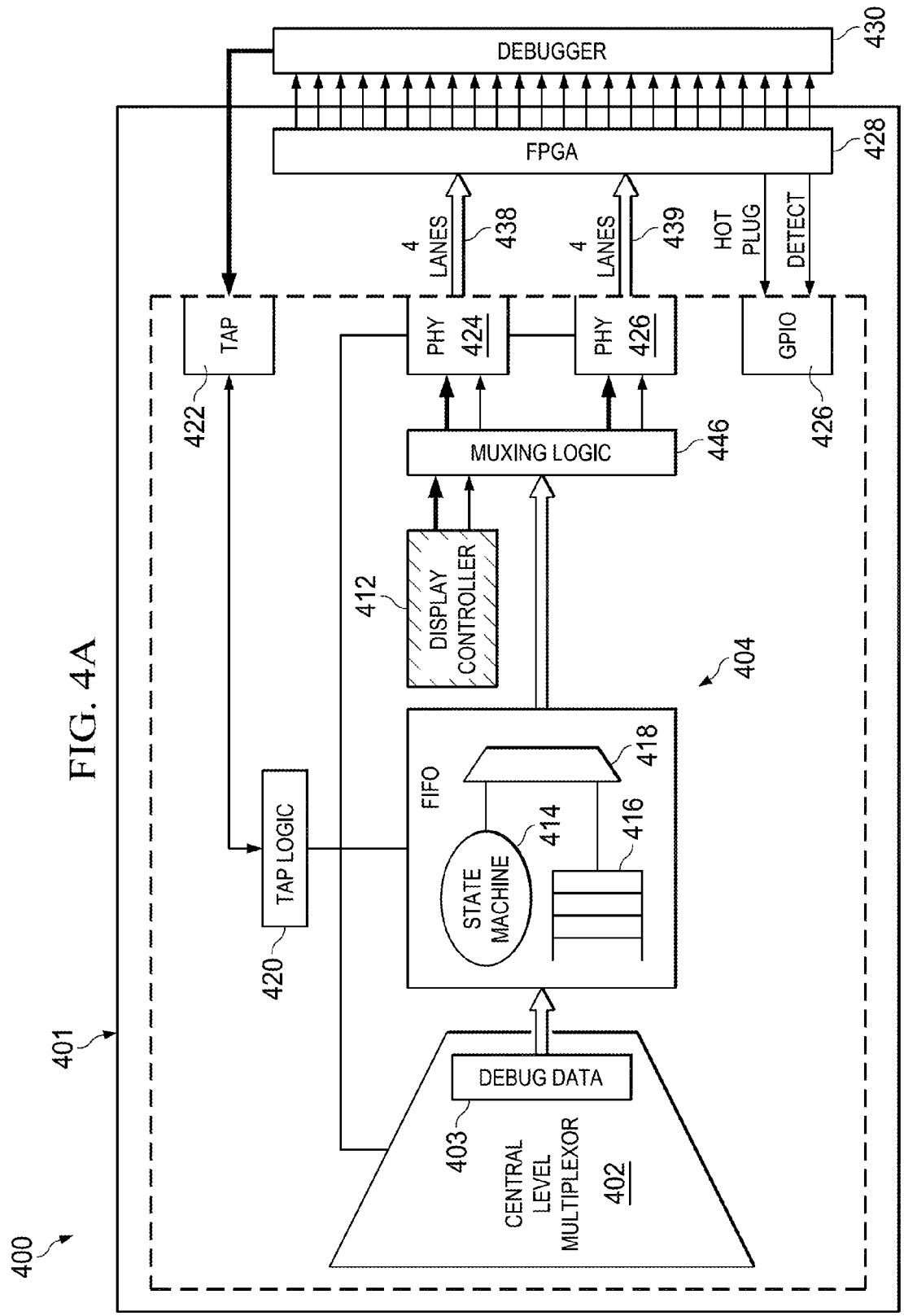
FIG. 4A is a schematic diagram illustrating further details of debug logic and associated components and logic, according to an embodiment.

A blown-up detail of one embodiment of debug logic 404 is shown in FIG. 4A. Debug logic block 404 includes a central level multiplexor 402, state machine 414, bandwidth-adapting First-In, First-Out (FIFO) buffer 416, and multiplexer 418. Also depicted in FIG. 4A are Test Access Port (TAP) logic 420 and TAP interface 422, multiplexor (muxing) logic 446, display controller 412, high-speed serial I/O interfaces 424, 426, FPGA (Field Programmable Gate Array) 428 and debugger 430.

Bandwidth-adapting FIFO buffer 416 receives and buffers debug data 403 received from various logic blocks/components (see FIGS. 3A, 3B). Generally, debug test data is transmitted at a variable rate. In some embodiments, the bandwidth-adapting FIFO buffer 416 transmits debug data at a fixed rate corresponding to the bandwidth supported by high-speed serial I/O interfaces 424, 426. The timing and coordination of debug data at debug logic 404 facilitated by state machine 414 and TAP logic 420.

Moving forward, high-speed serial I/O interfaces 424, 426 are shown to include physical layer interfaces (PHY) for a High Definition Multimedia Interface port (HDMI) and DisplayPort port. In some embodiments, during an operational mode, the high-speed serial I/O interfaces 424, 426 sends video display signal data to drive an external display device. Most notably, HDMI has a maximum bandwidth of 10.2 Gbps whereas DisplayPort has a maximum bandwidth of 17.28 Gbps.

High-speed serial I/O interfaces 424, 426 include various pins that are mapped to data signals, clock signals, shields, power and ground, hot plug detect, optional signals, etc. In some embodiments, select pins from among the HDMI port or DisplayPort PHYs on SoC device 400 are implemented as I/O pins configured to support four paths of serialized data, as depicted by arrows 438, 439 (i.e., labeled "4x" in FIGS. 3A, 3B and labeled "4 Lanes" in FIG. 4A emanating from high-speed serial I/O interfaces 408, 410). As shown, arrows 438, 439 point in the direction of FPGA 428 which indicates the direction of at least a subset of debug data aggregated at debug logic 406.

In some embodiments, during normal (i.e., non-test) operations, switches in muxing logic 446 may couple signals from display controller 412 to corresponding I/O signal inputs received at the PHY circuitry of the HDMI and/or DisplayPort ports. In some embodiments, if only one of the HDMI or DisplayPort PHYs 424, 426 is used for debug operations, then the muxing logic 446 only directs debug data to that PHY.

Conversely, during a testing (i.e., debug mode), the switches in muxing logic 446 may couple signals from the output of the debug logic 404 to I/O inputs corresponding to high-speed serial I/O interfaces 424, 426. As illustrated in FIG. 4A, cross-hatching is used to indicate that the output signals from display controller 412 are disconnected from corresponding I/O inputs corresponding to high-speed serial I/O interfaces 424, 426 via muxing logic 446.

In some embodiments, high-speed serial I/O interfaces with four lanes per serial I/O port may operate at transmit data bandwidths between 1.6 Gbps and 5 Gbps. The data bandwidth may be even greater in faster I/O interfaces such as PCIe, USB3, Thunderbolt™ or optical interfaces that may go as high as 50 Gbps, 100 Gbps or even higher. In some embodiments, each high-speed serial I/O interfaces 424, 426 support a baseline bandwidth of about 2.7 Gbps and may to support higher bandwidths (e.g. 3.3 Gbps and 5 Gbps). Additionally, when the high-speed serial I/O interfaces support eight lanes running at 3.3 Gbps, the data transmit bandwidth is approximately 26,400 Mbps whereas when high-speed serial I/O interfaces 424, 426 are operated at 5 Gbps, the data transmit bandwidth is approximately 40,000 Mbps, sufficient to support a maximum debug data rate transmitted from debug device 404.

During a testing mode, debug logic 404 may employ bandwidth-adapting FIFO buffer 416, and associated control logic, to "match" the bandwidth corresponding to the data rate at which debug data 403 is received from the various logic blocks. In addition, debug logic 404 may instead employ bandwidth adapting FIFO buffer 416, and associated control logic, to match the bandwidth corresponding to the data rate supported by high-speed serial I/O interfaces 424, 426.

In some embodiments, to match the bandwidth of the debug data-rate from the various outputs of the blocks, the embedded high speed debug port(s) 404 takes the debug data and fills bandwidth-adapting FIFO buffer 416 at the input rate of debug data 403 as it is received, while the output of FIFO buffer 416 is pulled at the rate at which the serial I/O interfaces are operated.

In some embodiments, high-speed serial I/O interfaces 424, 426 may serialize the debug data 403. In some embodiments, high-speed serial I/O interfaces serialize debug data 403 by adding synchronizing characters in addition to encoding (e.g. 8 b/10 b) the data that is to be sent out via high-speed serial I/O interfaces 424, 426. In some embodiments, logic in FPGA 428 de-serializes the debug data 403 which is subsequently transmitted to debugger 430 as parallel data.

Most notably, FPGA card 428 has input port(s) to receive the debug data from the high-speed serial I/O interfaces 424, 426 such as the display port(s). Alternatively, debug data may be sent directly to debugger 430 (or a logic analyzer) which contains test logic to test the received debug data which outputs a result in response to the test.

In some embodiments, 8 b/10 b encoding schemes may used in high-speed serial interconnects (e.g. Peripheral Component Interconnect Express) to achieve DC-balance and for clock recovery, enabling a sending component and receiving component to operate using separate clocks.

Figure 4B:
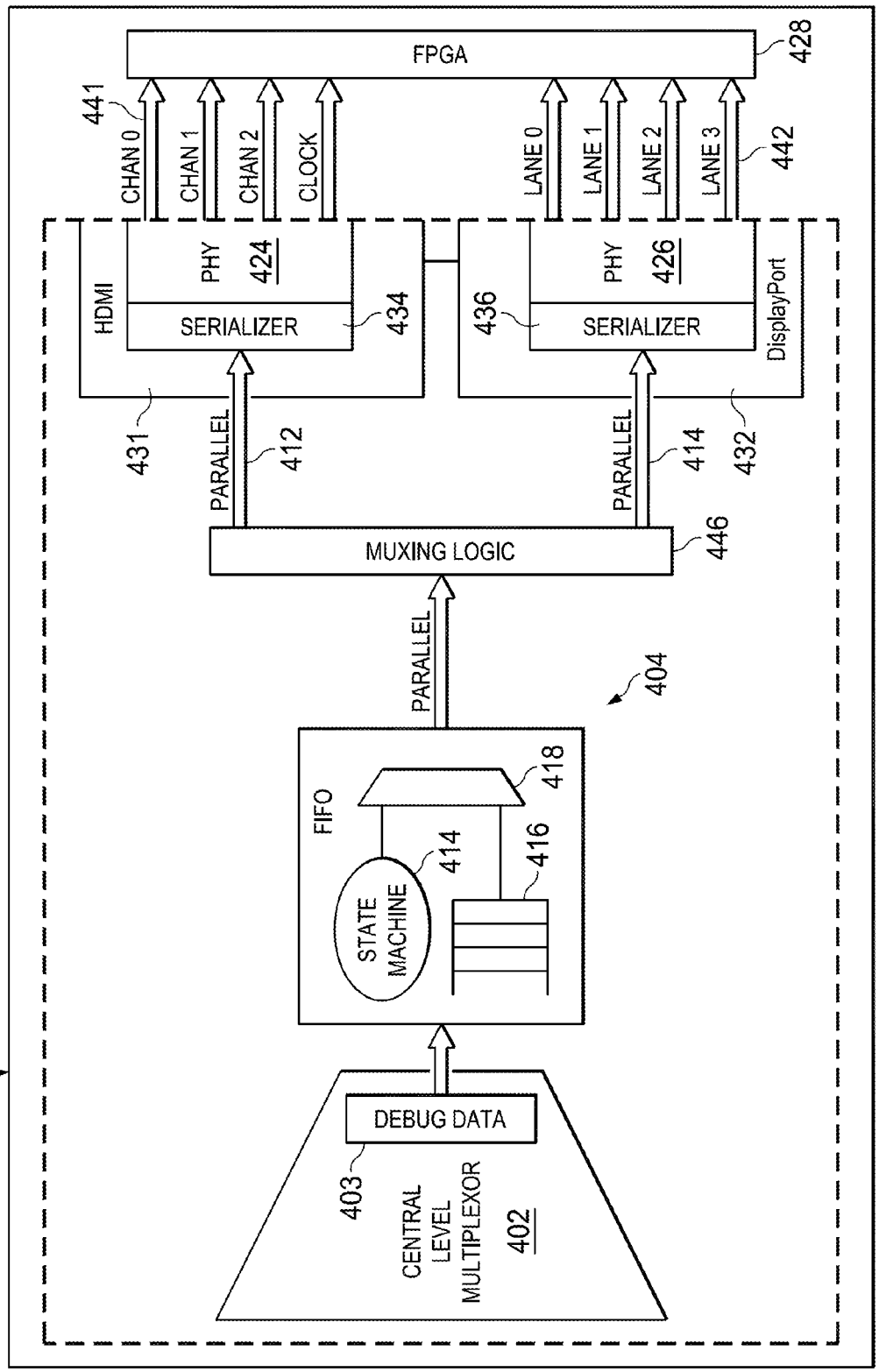
FIG. 4B shows further details of an embodiment of a debug architecture employing serialization operations at physical layer interfaces (PHYs)

FIG. 4B shows further details of some embodiments of a debug architecture employing serialization operations at one or more high-speed serial I/O interfaces. As illustrated, SoC device 400 includes a HDMI interface 430 and a DisplayPort interface 432. As further shown, a HDMI interface 431 includes a serializer 434 and physical layer interface 424 whereas a DisplayPort interface 432 includes a serializer 436 and physical layer interface 424. In some embodiments, serializers 434, 436 serialize parallel debug data 412, 414 that are output from debug logic 404. FIG. 4B further shows that muxing logic 446 directs parallel debug data 412, 414 to serializers 434, 436, respectively.

Serializers 434, 436 may perform 8 b/10 b encoding or add synchronization. In some embodiments, parallel data 412, 414 may be 8 b/10 b encoded or synchronized before reaching serializers 434, 436 (while at debug logic 404). In some embodiments, each serializer/PHY combination is implemented as part of a standard PHY interface block for one or more of a HDMI interface, DisplayPort interface or other types of high-speed serial I/O interfaces (e.g., USB2, USB3, Thunderbolt™ interfaces, etc.).

In some embodiments when implementing an HDMI interface 431 having four channels 441, channels 0, 1, and 2 are used to transmit data (e.g. SoC device 400 operates in a debug mode) in addition to HDMI Clock. In some embodiments, each channel 441 comprises a differentiated signal pair to transmit and receive data.

In some embodiments when implementing a DisplayPort interface 432 having four lanes 442, DisplayPort Lanes 0, 1, 2, and 3 are used to transmit data. In some embodiments, lanes 0-3 may also comprise differentiated signal pairs to transmit and receive data. Although depicted as employing PHYs 424 and 426, it should be understood by one having ordinary skill in the art that this is merely an exemplary configuration as either of PHYs 424, 426 may be employed individually, in combination with each other, or in combination with other physical interfaces (not shown).

FIG. 4C shows further details of an embodiment of a debug architecture employing serialization operations at debug logic 404. As illustrated, debug logic 404 includes a serializer 416 which converts parallel debug data into serialized data streams 418, 420 that are routed to high-speed serial I/O interfaces 424, 426 via muxing logic 446. In yet another embodiment, serialized data streams 418, 420 are provided as inputs to serializers 434 and 436, which may employ additional signal conditioning operations on the serialized data streams in conjunction with operations performed by PHYs 424, 426. As before, serializer 416 may employ 8 b/10 b encoding and/or add synchronization for serialize streams 418, 420.

Under various embodiments, debug data rates of approximately 32,000 MTS or greater may be supported. For example, operating a combination of the HDMI/DisplayPort serial I/O ports at 5 Gbps provides an output bandwidth of approximately 40,000 Mbps, which is sufficient bandwidth to send higher bandwidth debug data beyond 10 bytes running at 400 MTS. For example, 12 Bytes of debug data running at 400 MTS may require an output bandwidth of approximately 38,400 MTS below a maximum bandwidth (40,000 MTS) supported by HDMI and DisplayPort interfaces 430, 432.

The present disclosure is not limited to transmitting debug data via the high-speed serial I/O interface (e.g. HDMI or DisplayPort). Accordingly, the present disclosure is amenable to be implemented over various types of high-speed serial I/O ports and interfaces in combination with applicable muxing logic. For example, exemplary high-speed serial I/O interfaces along with their theoretical peak data bandwidth include PCIe ports (128 GT/s per lane for v3), SATA interface ports (6 GB/s), Intel® QuickPath Interconnect® (QPI) ports (25.6 GB/s), USB 2.0 (480 Mbps), USB 3.0 (4.8 Gbps), or Thunderbolt™ interfaces (10 Gbps), Fire800 (800 Mbps), Express Card (2.5 Gbps), serial memory interfaces, etc. Furthermore, the techniques may be implemented over a single serial I/O or a combination of serial I/Os such as PCIe which may support transmissions up to 32 lanes via a single PCIe port.

In some embodiments, each high-speed serial I/O interface may be associated with a corresponding functional block during normal IC or SoC operations (or at least during operational modes when the functional block and its associated high-speed serial I/O interface is being used). In the context of the embodiment illustrated in FIG. 4C, display controller 412 comprises a functional block associated with each of high-speed serial I/O interfaces 424, 426. In the context of using a PCIe port each corresponding PCIe logic block (e.g., one or a combination of logic corresponding to a PCIe agent, PCIe interface, or PCIe root port) would comprise a single functional block associated with the high-speed serial I/O interface.

Figure 5:
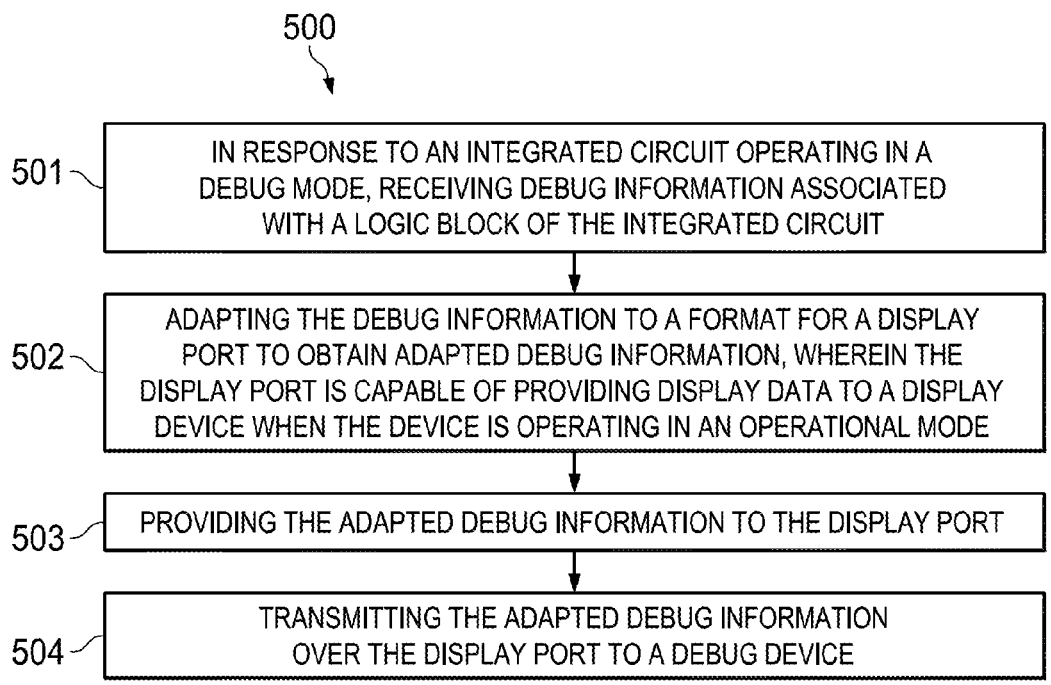
FIG. 5 shows a method of aggregating and transmitting debug data outbound from an integrated circuit.

FIG. 5 illustrates a flowchart of a method 500 of aggregating and transmitting debug data outbound from an integrated circuit of SoC device. Method 500 begins with block 501 which provides that, in response to an integrated circuit operating in a debug mode, receiving debug information associated with a logic block of the integrated circuit. As described above, debug information may be received from a partition level multiplexor within each logic block in accordance with some embodiments of the present disclosure.

Next, block 502 provides adapting the debug information to a format for a display port to obtain adapted debug information, wherein the display port is capable of providing display data to a display device when the device is operating in an operational mode. As previously described in relation to FIG. 4C, debug logic may serialize data before the data is output to muxing logic. Moreover, debug logic or any other logic block or component may configure the debug data to a certain clock frequency. In some embodiments, debug logic configures at least a subset of the debug data to match the clock frequency of the system clock. For example, debug data is set to a clock frequency of 200 Mhz, 250 Mhz, 266 Mhz, or 333 Mhz.

Next, according to block 503, providing the adapted debug information to the display port. For example, the adapted debug information may be provided to an HDMI interface or DisplayPort interface as shown in FIGS. 3A-4C. Finally, transmitting the adapted debug information over the display port to a debug device according to block 504. Advantageously, when the integrated circuit is in a test mode, the high-speed serial I/O interface may be utilized to transmit debug data to an external device (e.g., debugger).

Figure 6:
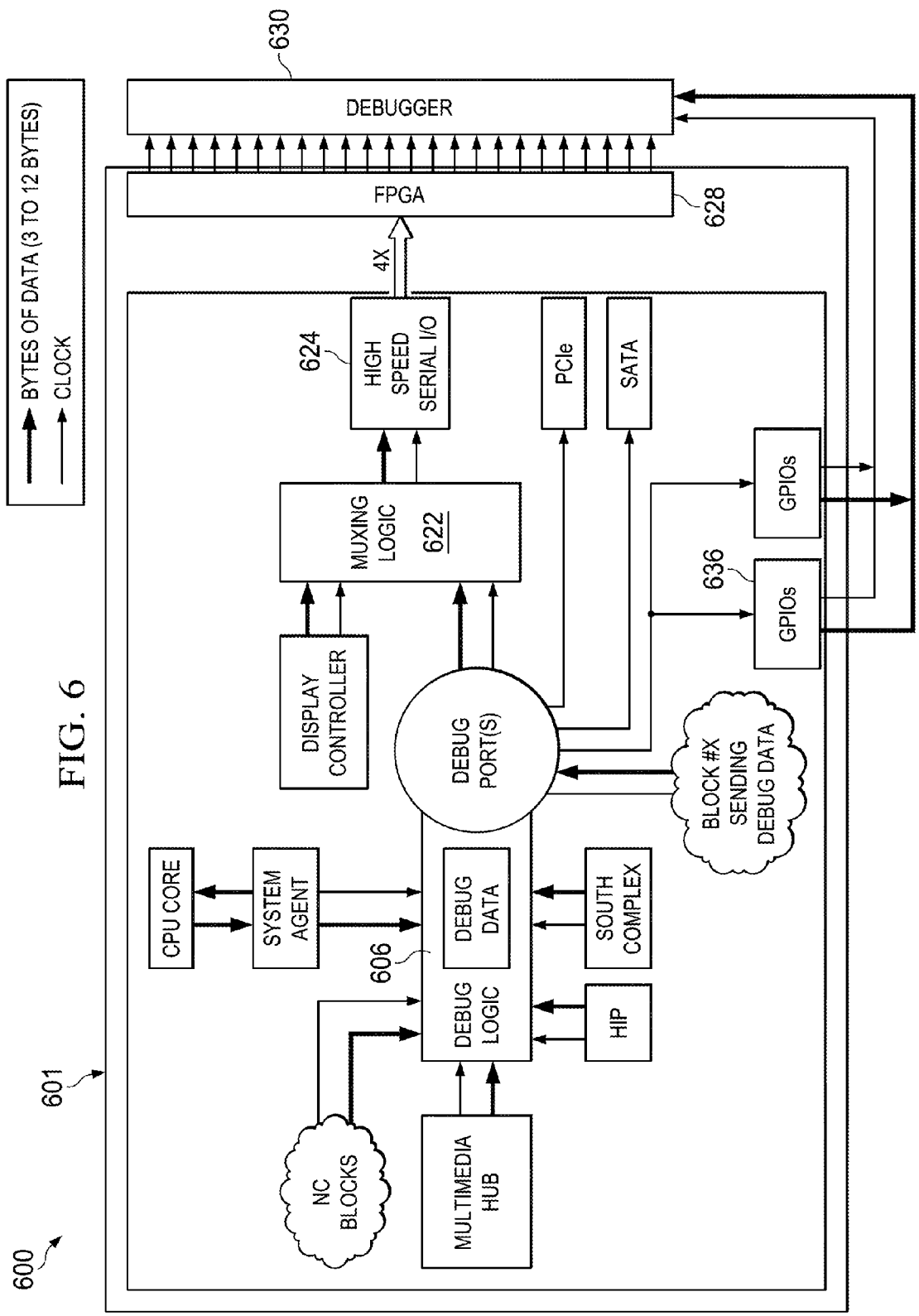
FIG. 6 is a schematic diagram illustrating a debug architecture employing debug logic to support high bandwidth transmission of debug data to a debugger, according to an embodiment.

FIG. 6 is a schematic diagram illustrating debug architecture of a SoC device 600 employing debug logic to support high bandwidth transmission of debug data to a debugger 630, according to an embodiment of the present disclosure.

As shown, SoC device 600 includes debug logic which may collect debug data from various logic blocks (e.g., north complex block, internal and external intellectual property blocks, south complex block, display port, multimedia block, graphics block, system agent of the CPU core, etc.) format the debug data and send the data to high-speed serial I/O interface 624 which routes the debug data outbound from the SoC device 600. In some embodiments, each logic block has a plurality of unit level multiplexors (not shown) and a single partition level multiplexor (not shown) which transmits debug data to a central level multiplexor (not shown) of the debug logic. In some embodiments, at least a portion of debug data received and collected at debug logic 606 is transmitted to GPIO ports 636 to be transferred outbound from the SoC device 600 for test.

As such, GPIO ports 636 may serve as an additional outbound pathway for debug data. Although GPIO ports 636 may have a smaller data bandwidth than high-speed serial I/O interface 624 which may provide debug data to a debugger 630 for early debug testing. In some embodiments, the debug data sent to GPIO port 636 is in a native format. For example, the debug data may not be re-formatted before being sent to the GPIO port 636. As such, in some embodiments, the debug data collected from various logic blocks on the SoC device 600 may retain the format even after the collected debug data is sent to the GPIO ports 636.

In addition, the debug data that is sent to the GPIO ports 636 may retain a native clock frequency requiring less power than when sending debug data outbound via the high speed serial I/O interface 624. As such, in some embodiments, the debug data sent to the GPIO ports 636 is not configured to a common clock frequency (e.g., system clock frequency) and the debug data that is sent to high-speed serial I/O interface 624.

Furthermore, although two GPIO ports 636 are shown in FIG. 6, one having ordinary skill in the art should appreciate that SoC 600 may have any number of GPIO ports 636. In an embodiment of the present disclosure, SoC 600 has eight GPIO ports 6363 which may receive debug data in native form and transfer the debug data outbound from the SoC device 600 to an external device (e.g., FPGA card or debugger).

In some embodiments, when SoC device 600 is in operational mode, control logic may send display data to muxing logic 622 which selects the display data and sends the display data to high-speed serial I/O interface 624 to be transferred from the SoC device 600 to a test module (e.g., debugger).

The high-speed serial I/O interface 624 shown in FIG. 6 has four lanes or channels depending on the type of interface 624 (e.g., an HDMI or DisplayPort interface). However, the present disclosure is not limited to any number of high-speed serial I/O interfaces 624 or quantity of channels and lanes associated therewith.

Figure 7:
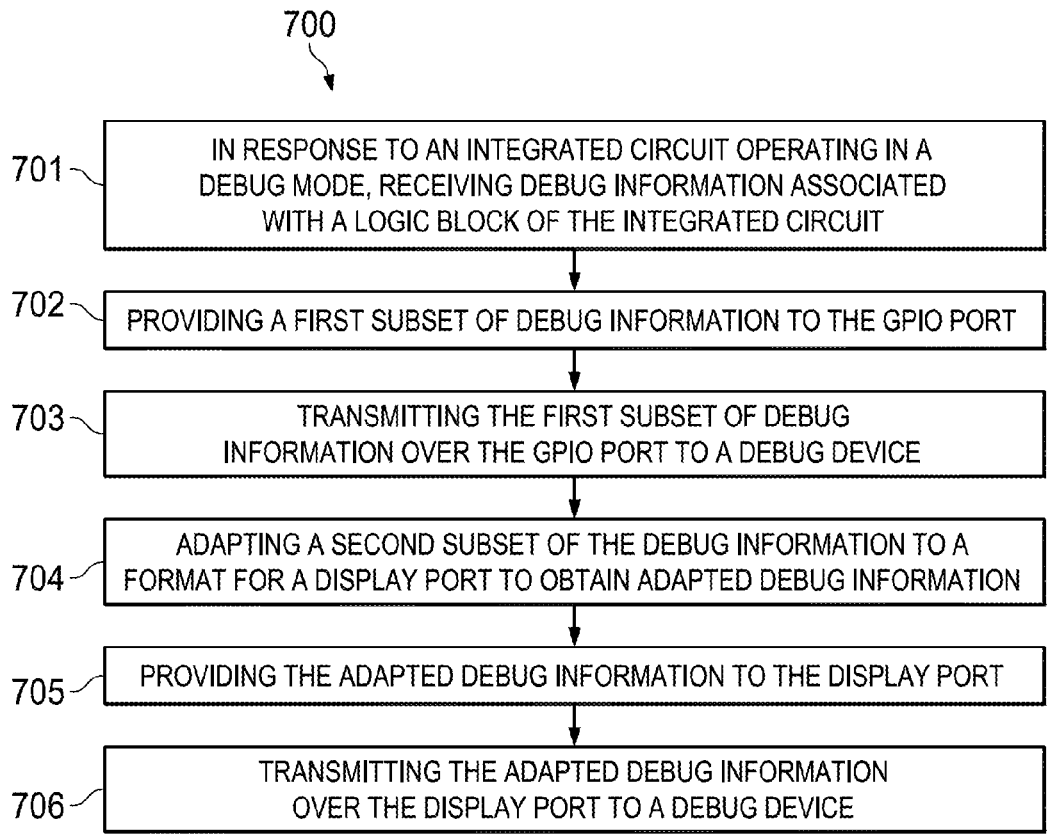
FIG. 7 shows another method of aggregating and transmitting debug data outbound from an integrated circuit.

FIG. 7 shows another method 700 of aggregating and transmitting debug data outbound from an integrated circuit. Block 701 of method 700 provides, in response to an integrated circuit operating in a debug mode, receiving debug information association with a logic block of the integrated circuit.

Next, block 702 provides, providing a first subset of debug information to the GPIO port. As previously described in relation to FIG. 6, debug information may be partitioned such that a portion of the debug information is sent outbound via the high-speed serial I/O interface while another portion of the debug information is sent outbound via the GPIO port.

Block 703 provides transmitting the first subset of debug information over the GPIO port to a debug device. As discussed, in some embodiments, the first subset of debug information is sent in a native format, without formatting, to enable early debug testing at low frequencies.

Block 704 provides adapting a second subset of debug information to a format for a display port to obtain adapted debug information. In some embodiments, the second subset of debug information is formatted to be consistent with an HDMI format or alternatively a DisplayPort format. In addition, the second subset of debug information may be formatted or configured to have a common clock frequency.

Next, providing the adapted debug information to the display port according to block 705 and finally transmitting the adapted debug information over the display port to a debug device as provided by block 706.

While the present disclosure has been described with respect to a limited number of embodiments, those skilled in the art will appreciate numerous modifications and variations therefrom. It is intended that the appended claims cover all such modifications and variations as fall within the true spirit and scope of this present disclosure.

An apparatus, system and method for a common unified debug architecture for integrated circuits and SoCs have been described. A debug device consistent with the present disclosure may include an input port to receive debug data from a display port of a SoC device. The debug device further includes test logic to test the received debug data. In response to the test(s), the test logic outputs a result.

The input port of the debug device may receive debug data from a General Purpose Input/Output (GPIO) port. The input port may be coupled to a touch enabled display device or System on Chip (SoC). Furthermore, the display port may be a component of a System on Chip (SoC) device. In some embodiments, the display port is one or more of a High-Definition Multimedia Interface (HDMI) port or a DisplayPort.

The present disclosure further includes a method of transmitting debug data form an integrated circuit or SoC device. In response to an integrated circuit operating in a debug mode, receiving debug information association with a logic block of the integrated circuit. Furthermore, adapting the debug information to a format for a display port to obtain adapted debug information. In some embodiments, the display port is capable of providing display data to a display device when the integrated circuit is operating in an operational mode. Furthermore, providing the adapted debug information the display port. Finally, transmitting the adapted debug information over the display port to a debug device.

In some embodiments, the adapted debug information is transmitted over the display port to the debug device at one or more of an approximate rate of 10 Gbps or 17 Gbps. Further, the method may include receiving the adapted debug information at the debug device and resolving an error associated with the integrated circuit. In addition, aggregating debug information in a partition level multiplexor within the logic block.

The method may further include providing debug information to the general I/O port at a first frequency and providing adapted debug information to the display at a second frequency. Furthermore, directing the debug information from one or more unit level multiplexors in the logic block and directing the debug information from one or more partition level multiplexors in the logic block.

An apparatus, in accordance with an embodiment of the present disclosure, includes an integrated circuit. The integrated circuit may include a display port, a plurality of logic blocks, debug logic and control logic.

In some embodiments, debug logic may receive debug data from one or more of the plurality of logic blocks in response to the integrated circuit operating in a debug mode. The control logic may be coupled to at least the debug logic.

The control logic is to provide display data to the display port in response to the integrated circuit operating in an operational mode. In addition, the control logic may direct high-speed debug data to the display port in response to the integrated circuit operating in the debug mode. The high-speed debug data is to be based on the debug data.

An apparatus consistent with the present disclosure may further comprise a GPIO port which is responsive to the control logic and may receive debug data from the control logic when the integrated circuit is operating in the debug mode.

The received debug data may be transmitted to the GPIO port at a native clock frequency. In addition, the control logic may provide the display data to the display port at a common clock frequency. Furthermore, the display port may be one or more of a High-Definition Multimedia Interface (HDMI) port or a DisplayPort.

In addition, the plurality of logic blocks may include one or more of multimedia block, intellectual property block, or a system agent block. The debug logic may include one or more central level multiplexors which aggregate debug data from the one or more plurality of logic blocks. The display port may support a bandwidth of at least 5 Gb/s.

Apparatus consistent with the present disclosure may have the capability to collect and direct debug data outbound from an integrated circuit. The integrated circuit may include a first output port, a second output port, a plurality of logic blocks, and debug logic.

The debug logic may be coupled to the plurality of logic blocks. The debug logic may receive debug data from the plurality of logic blocks and direct at least a first portion of the debug data to the first output port at a native clock frequency. The debug logic may direct at least a second portion of the debug data to the second output port at a converted clock frequency.

In some embodiments, the first output port is one or more of a GPIO port, SATA port, or a PCIe port. In some embodiments, the second output port is one or more of a HDMI port or a DisplayPort.

Further, in some embodiments, the plurality of logic blocks may include one or more of a multimedia block, intellectual property block, graphics block, and system agent block. The debug logic includes one or more of a central multiplexor logic, gasket logic, or data compression logic. In addition, the debug logic directs the first portion of the debug data outbound from the integrated circuit for early debug testing such that the first portion of the debug data is tested before the second portion of the debug data.

Furthermore, debug testing the first portion of the debug data requires lower power than debug testing the second portion of the debug data. In addition, the first portion of the debug data is one or more of all of the debug data or a first subset of all of the debug data. The second portion of the debug data is one or more of all of the debug data or a second subset of the debug data.

In addition, the second portion of the debug data is directed to the second output port at a common clock frequency.

Yet another apparatus consistent with the present disclosure has the capability to collect and direct debug outbound from a SoC device via a high-speed serial interface. In some embodiments, a SoC device includes a high-speed serial interface, an intellectual property block (IP) block, and control logic.

The high-speed serial interface is adapted to provide packetized data to a non-debug device in response to the integrated circuit operating in an operational mode. The intellectual property (IP) block to include debug logic to provide debug data to central debug logic in response to the SoC device operating in a debug mode.

In addition, the control logic may be coupled to the central debug logic and the high-speed serial interface. The control logic may be configured to receive the debug data, to adapt the debug data to packetized debug data, and provide the packetized debug data to the high-speed serial interface in response to the SoC device operating in the debug mode. Finally, the high-speed serial interface may provide the packetized debug data to a debug device in response to the SoC device operating in the debug mode.

In some embodiments, an apparatus consistent with the present disclosure includes a GPIO interface port coupled to the control logic and receives debug data when the SoC device operates in a debug mode. In some embodiments, the debug device is at least one of a logic analyzer device, oscilloscope, or a FPGA device.

The IP block component of an apparatus consistent with the present disclosure may include a Hard IP block in accordance with some embodiments of the present disclosure. Furthermore, the SoC device may be coupled to or may be a component of a netbook, table, or smartphone.

A method consistent with the present disclosure may include aggregating and transmitting debug information outbound from an integrated circuit. In response to an integrated circuit operating in a debug mode, receiving debug information associated with a logic block of the integrated circuit. The method may include adapting the debug information to a format for a display port to obtain adapted debug information. The display port is capable of providing display data to a display device when the integrated circuit is operating in an operational mode. Further, the method includes providing the adapted debug information to the display port. Additionally, transmitting the adapted debug information over the display port to a debug device.

In some embodiments, the method further comprising providing the debug information to a general I/O port and receiving the adapted debug information at the debug device and resolving an error associated with the integrated circuit. In addition, aggregating the debug information in a partition level multiplexor within the logic block.

A method consistent with the present disclosure may further include proving debug information to the general I/O port at a first frequency and providing adapted debug information to the display port at a second frequency. Further, buffering the debug information in a FIFO buffer. The debug information may be associated with one or more of an internal IP or an external IP of the logic block.

The present disclosure may further include an integrated circuit which is consistent with the present disclosure. The integrated circuit includes a display port, a plurality of logic blocks, debug logic, control logic, and a GPIO port. The debug logic may receive debug data from one or more of the plurality of logic blocks in response to the integrated circuit operating in a debug mode.

The control logic coupled to the debug logic wherein the control logic may provide display data to the display port in response to the integrated circuit operating in an operational and to direct high-speed debug data to the display port in response to the integrated circuit operating in the debug mode. The high-speed debug data may be based on the debug data. In addition, the GPIO port may be responsive to the control logic and may receive debug data from the control logic when the integrated circuit is operating in the debug mode.

In some embodiments, the integrated circuit is coupled to a touch enabled display device. The integrated circuit may also include a SoC device.

In some embodiments, the display may be one or more of a HDMI port or a DisplayPort. Further, the plurality of logic blocks of an integrated circuit consistent with the present disclosure may include one or more of a multimedia block, intellectual property block or a system agent block. Furthermore, the debug logic includes one or more central level multiplexors which aggregate debug data from the one or more plurality of logic blocks. Additionally, the display port may support a bandwidth of at least 5 Gb/s.

A touch enabled display device consistent with the present embodiment may include an integrated circuit. The integrated circuit may include a first output port, second output port, a plurality of logic blocks, and debug logic.

The debug logic may receive debug data from the plurality of logic blocks. The debug logic may also direct a first portion of the debug data to the first output port at a native clock frequency. The debug logic may also direct a second portion of the debug data to the second output port at a converted clock frequency.

In some embodiments, the first output port is one or more of a GPIO port, SATA port, or a PCIe port and the second output port is one or more of a HDMI port or a DisplayPort.

Further, the plurality of logic blocks may include one or more of a multimedia block, intellectual property block, graphics block, and system agent block. The debug logic may include one or more of a central multiplexor logic, gasket logic, or data compression logic.

In addition, the debug logic may direct the first portion of the debug data outbound from the integrated circuit for early debug testing such that a first portion of the debug data is tested before the second portion of the debug data.

In some embodiments, debug testing the first portion of the debug data requires lower power than debug testing the second portion of the debug data. The first portion of the debug data is one or more of all of the debug data or a first subset of the debug data. In addition, the second portion of the debug data is one or more of all of the debug data or a second subset of the debug data. Notably, the converted clock frequency is a common clock frequency.

In addition, a method consistent with some embodiments of the present disclosure may include, in response to an integrated circuit operating in a debug mode, receiving debug information associated with a logic block of the integrated circuit. Next, adapting the debug information to a format for a display port to obtain adapted debug information. The display port is capable of providing display data to a display device when the integrated circuit is operating in an operational mode. Next, providing the adapted debug information to the display port and transmitting the adapted debug information over the display port to a debug device.

The method described may include providing the debug information to a GPIO port. In addition, the method described may include receiving the adapted debug information at the debug device and resolving an error associated with the integrated circuit. Furthermore, the method may include aggregating debug information in a partition level multiplexor with the logic block.

A method consistent with the present disclosure may include providing debug information to the GPIO port at a first frequency and providing adapted debug information to the display port at a second frequency. In addition, buffering the debug information in a FIFO buffer.

In some embodiments, the debug information is associated with one or more of an internal IP or an eternal IP of the logic block.

An apparatus consistent with the present disclosure may have the capability to collect and direct debug data outbound from a SoC device via a high-speed serial interface. The apparatus may include a SoC device. In some embodiments, the SoC device includes a high-speed serial interface, intellectual property (IP) block, and control logic.

The high-speed serial interface may be adapted to provide packetized data to a non-debug device in response to the integrated circuit operating in an operational mode. The IP block ma include debug logic to provide debug data to central debug logic in response to the SoC device operating in a debug mode.

In addition, the control logic may be coupled to the central debug logic and the high-speed serial interface. The control logic may be configured to receive the debug data, to adapt the debug data to packetized debug data, and provide the packetized debug data to the high-speed serial interface in response to the SoC device operating in the debug mode. In addition, the high-speed serial interface is to provide the packetized debug data to a FPGA device in response to the SoC device operating in the debug mode.

In some embodiments, an apparatus consistent with the present disclosure includes a GPIO interface port coupled to the control logic and receives debug data when the SoC device operates in a debug mode. In addition, the IP block may include a Hard IP block.

In addition, the high-speed serial interface is at least one of a HDMI port or a DisplayPort. Also, the SoC device may be coupled to a netbook, tablet or smartphone.

Finally, a machine-readable storage may include machine-readable instructions, when executed, implements a method or realizes an apparatus consistent with the present disclosure.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in some embodiments, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as may be inferred, in yet another embodiment, the term module (in this example) may refer to the combination of the microcontroller and the non-transitory medium. Often module boundaries that are illustrated as separate vary and potentially overlap. For example, a first and a second module may share hardware, software, firmware, or a combination thereof, while potentially retaining some independent hardware, software, or firmware. In some embodiments, use of the term logic includes hardware, such as transistors, registers, or other hardware, such as programmable logic devices.

Use of the phrase "to" or "configured to," in some embodiments, refers to arranging, putting together, manufacturing, offering to sell, importing and/or designing an apparatus, hardware, logic, or element to perform a designated or determined task. In this example, an apparatus or element thereof that is not operating is still "configured to" perform a designated task if it is designed, coupled, and/or interconnected to perform said designated task. As a purely illustrative example, a logic gate may provide a 0 or a 1 during operation. But a logic gate "configured to" provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases "capable of/to," and or "operable to," in some embodiments, refers to some apparatus, logic, hardware, and/or element designed in such a way to enable use of the apparatus, logic, hardware, and/or element in a specified manner. Note as above that use of to, capable to, or operable to, in some embodiments, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In some embodiments, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in some embodiments, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc, which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions may be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Reference throughout this specification to "one embodiment" or "an embodiment" means that a particular feature, structure, or characteristic described in connection with the embodiment is included in at least one embodiment of the present disclosure. Thus, the appearances of the phrases "in some embodiments" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplary language does not necessarily refer to the same embodiment or the same example, but may refer to different and distinct embodiments, as well as potentially the same embodiment.

What is claimed is:

1. An apparatus comprising:
   an integrated circuit including,
   a display port;
   a plurality of logic blocks;
   debug logic to receive debug data from one or more of the plurality of logic blocks in response to the integrated circuit operating in a debug mode;
   control logic coupled to at least the debug logic, the control logic to provide display data to the display port at a first frequency in response to the integrated circuit operating in an operational mode and to direct high-speed debug data to the display port in response to the integrated circuit operating in the debug mode, wherein the high-speed debug data is to be based on the debug data; and
   a General Purpose Input/Output (GPIO) port which is responsive to the control logic and may receive debug data from the control logic at a second frequency when the integrated circuit is operating in the debug mode.

2. The apparatus of claim 1, wherein the integrated circuit is coupled to a touch enabled display device.

3. The apparatus of claim 1, wherein the integrated circuit includes a System on Chip (SoC) device.

4. The apparatus of claim 1, wherein the display port is one or more of a High-Definition Multimedia Interface (HDMI) port or a DisplayPort.

5. The apparatus of claim 1, wherein the plurality of logic blocks include one or more of a multimedia block, intellectual property block, or system agent block.

6. The apparatus of claim 1, wherein the debug logic includes one or more central level multiplexors which aggregate debug data from the one or more plurality of logic blocks.

7. The apparatus of claim 1, wherein the display port may support a bandwidth of at least 5 Gb/s.

8. An apparatus comprising:
an integrated circuit including,
a first output port;
a second output port;
a plurality of logic blocks;
debug logic coupled to the plurality of logic blocks, the debug logic to receive debug data from the plurality of logic blocks and to direct at least a first portion of the debug data to the first output port at a native clock frequency and to direct at least a second portion of the debug data to the second output port at a converted clock frequency.

9. The apparatus of claim 8, wherein the first output port is one or more of a GPIO port, serial ATA (SATA) port, or a Peripheral Controller Interconnect Express (PCIe) port.

10. The apparatus of claim 8, wherein the second output port is one or more of a HDMI port or a DisplayPort.

11. The apparatus of claim 8, wherein the plurality of logic blocks may include one or more of a multimedia block, intellectual property block, graphics block, or system agent block.

12. The apparatus of claim 8, wherein the debug logic includes one or more of a central multiplexor logic, gasket logic, or data compression logic.

13. The apparatus of claim 8, wherein the debug logic directs the at least a first portion of the debug data outbound from the integrated circuit for early debug testing such that the at least a first portion of the debug data is tested before the at least a second portion of the debug data.

14. The apparatus of claim 8, wherein the debug testing the at least a first portion of the debug data requires lower power than debug testing the at least a second portion of the debug data.

15. The apparatus of claim 8, wherein the at least a first portion of the debug data is one or more of all of the debug data or a first subset of the debug data and wherein the at least a second portion of the debug data is one or more of all of the debug data or a second subset of the debug data.

16. The apparatus of claim 8, wherein the converted clock frequency is a common clock frequency.

17. An apparatus, comprising:
a system on a chip (SoC) including,
a high-speed serial interface adapted to provide packetized data to a non-debug device in response to the integrated circuit operating in an operational mode;
an intellectual property block (IP) block to include block debug logic to provide debug data to central debug logic in response to the SoC operating in a debug mode; and
control logic coupled to the central debug logic and the high-speed serial interface, the control logic configured to receive the debug data, to adapt the debug data to packetized debug data, and provide the packetized debug data to the high-speed serial interface in response to the SoC operating in the debug mode;
wherein the high-speed serial interface is to provide the packetized debug data to a debug device in response to the SoC operating in the debug mode.

18. The apparatus of claim 17 further comprising a GPIO interface port coupled to the control logic and receives debug data when the SoC operates in a debug mode.

19. The apparatus of claim 17, wherein the debug device is coupled to at least one of a logic analyzer device or a field programmable grid array (FPGA) device.

20. The apparatus of claim 17, wherein the IP block is a Hard IP block.

21. The apparatus of claim 17, wherein the a high-speed serial interface is at least one or a HDMI port of a DisplayPort.

22. The apparatus of claim 17, wherein the SoC is coupled to a netbook, tablet, or smartphone.

23. A method comprising:
in response to an integrated circuit operating in a debug mode,
receiving debug information associated with a logic block of the integrated circuit;
wherein the debug information is associated with one or more of an internal IP or an external IP of the logic block;
adapting the debug information to a format for a display port to obtain adapted debug information, wherein the display port is capable of providing display data to a display device when the integrated circuit is operating in an operational mode;
providing the adapted debug information to the display port; and
transmitting the adapted debug information over the display port to a debug device.

24. The method of claim 23 further comprising providing the debug information to a general I/O port.

25. The method of claim 23 further comprising receiving the adapted debug information at the debug device and resolving an error associated with the integrated circuit.

26. The method of claim 23 further comprising aggregating debug information in a partition level multiplexor within the logic block.

27. The method of claim 24 further comprising providing debug information to the general I/O port at a first frequency and providing adapted debug information to the display port is at a second frequency.

28. The method of claim 23 further comprising buffering the debug information in a FIFO buffer.

* * * * *